Jan. 9, 1962   P. H. LINDBERG   3,016,248
TANK-THIMBLE ATTACHMENT MECHANISM
Filed March 14, 1958   2 Sheets-Sheet 1
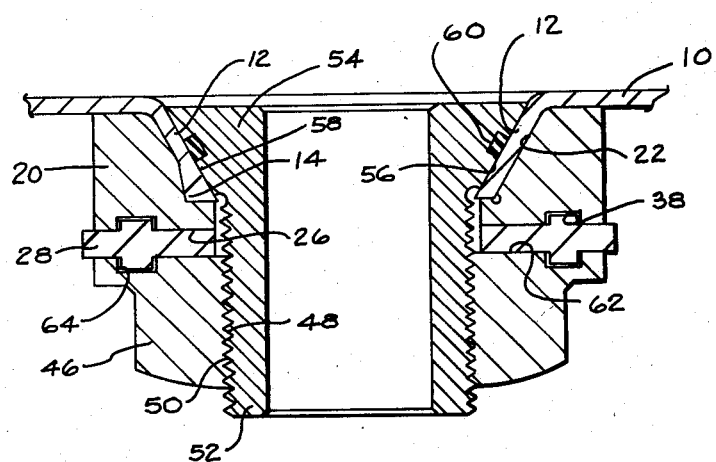
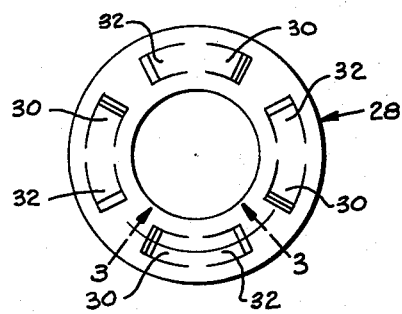
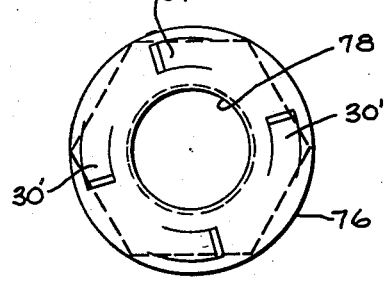
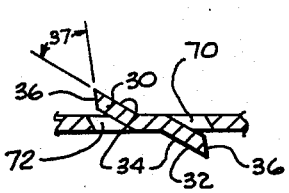
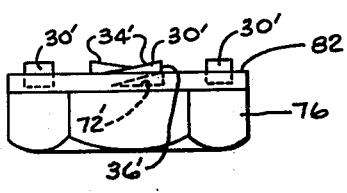
INVENTOR.
PETER H. LINDBERG
BY
SMITH, WILSON, LEWIS & McRAE Jan. 9, 1962 P. H. LINDBERG 3,016,248
TANK-THIMBLE ATTACHMENT MECHANISM
Filed March 14, 1958 2 Sheets-Sheet 2
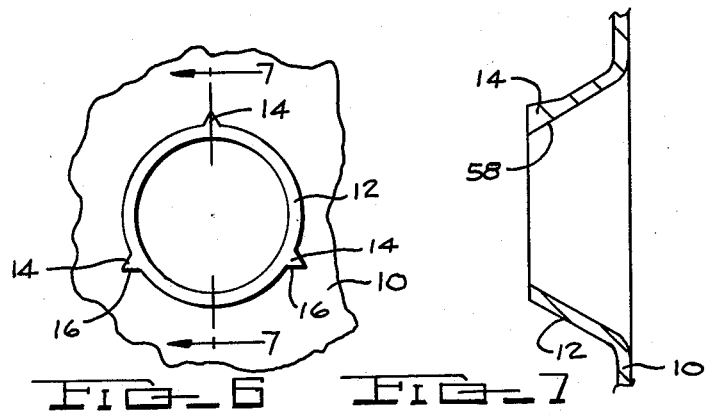
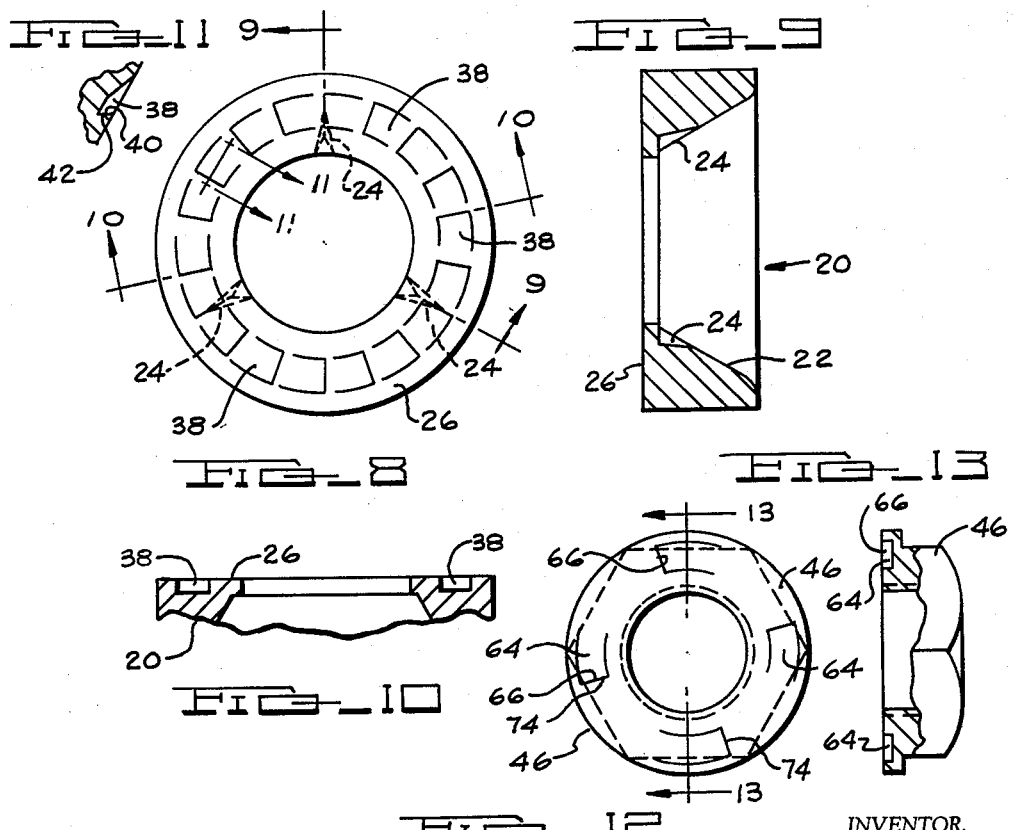
INVENTOR.
PETER H. LINDBERG
BY
SMITH, WILSON, LEWIS & McRAE

United States Patent Office 3,016,248
Patented Jan. 9, 1962

3,016,248
TANK-THIMBLE ATTACHMENT MECHANISM
Peter H. Lindberg, 492 Drexel St., Detroit 15, Mich.
Filed Mar. 14, 1958, Ser. No. 721,419
2 Claims. (Cl. 285—89)

This invention relates to mechanism for permanently attaching a thimble structure or a conical shaped member onto the wall of a tank or on a flat surface as for example automotive gas tanks, airplane engine gas tanks, or power lawn mower gas tanks. The hollow thimble structure is employed as a connecting device between the tank and its fuel line.

In installations of the above-mentioned type the tank is sometimes subject to considerable vibrations which tend to weaken and loosen the connection between the tank wall and thimble structure.

Objects of the present invention are to provide a mechanism for attaching a thimble structure onto a tank wall wherein:

(1) The thimble structure is threadedly prevented from becoming detached from the tank, either by vibratory forces or manual disassembly operations, thereby insuring that the thimble structure will always remain locked in the desired position, (2) The thimble structure is mounted onto the tank wall without welding, soldering, brazing or similar high cost attaching procedures, (3) The thimble structure is mounted in such position as to form a permanently fluid-tight joint with the tank wall, (4) The thimble structure is mounted on the tank wall in such manner as not to deform, weaken or otherwise injure the tank wall, thereby enabling the construction to withstand considerable abuse in service without leakage of the thimble-tank joint.

Other objects of this invention will appear in the following description and appended claims, reference being had to the accompanying drawings forming a part of this specification wherein like reference characters designate corresponding parts in the several views.

In the drawings:

FIG. 1 is a sectional view through a thimble-tank wall connection embodying the invention.

FIG. 2 is a top plan view of a lock washer employed in the FIG. 1 embodiment.

FIG. 3 is a sectional view on line 3—3 in FIG. 2.

FIG. 4 is a plan view of a locking nut employed in a second embodiment of the invention.

FIG. 5 is an elevational view of the FIG. 4 locking nut.

FIG. 6 is a plan view of the FIG. 1 tank wall, with the FIG. 1 thimble structure and connecting mechanisms removed for illustration purposes.

FIG. 7 is a sectional view on line 7—7 in FIG. 6.

FIG. 8 is a plan view of a locking collar employed in the FIG. 1 embodiment.

FIG. 9 is a sectional view on line 9—9 in FIG. 8.

FIG. 10 is a sectional view on line 10—10 in FIG. 8.

FIG. 11 is a sectional view on line 11—11 in FIG. 8.

FIG. 12 is a plan view of a lock nut employed in the FIG. 1 embodiment.

FIG. 13 is an elevational view of the FIG. 12 nut, with parts broken away on line 13—13.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a portion 10 of a cylindrical gas tank wall formed of thin gauge aluminum or other soft metal or plastic material. Wall portion 10 is integrally formed with a conical flange 12 having a plurality of axially elongated lugs 14 defining the exposed abutment faces 16.

Telescoped over flange 12 is a collar 20 formed of metal or plastic. Collar 20 is provided with a conical inner surface 22 in which are provided a plurality of grooves 24 mating with the aforementioned lugs. The arrangement of parts is such that when collar 20 is forced into its FIG. 1 position lugs 14 cooperate with grooves 24 to prevent any rotation of the collar on flange 12.

Engaged with end face 26 of the collar is a lock washer 28 having a series of resilient arms 30 and 32 projecting at acute angles from its opposite faces as shown in FIG. 3. Each of the arms is provided with a cam face 34 and a locking face 36. The locking faces extend at acute angles 37 from faces 34 so as to better lock against companion faces formed within member 20. In this connection it will be noted from FIGS. 8 and 11 that collar 20 is provided with a series of pockets 38 in its end face 26. Each of these pockets is in part defined by a locking face 40 which extends inwardly at an acute angle from face 26 to form a lip 42 partly overlying the pocket as shown in FIG. 11. The interengagement of members 20 and 28 is such that in the FIG. 1 position locking faces 36 (FIG. 3) are engaged against locking faces 40 so as to be prevented by lips 42 from working out of pocket 38. The action of lips 42 is such as to enhance the frictional locking action of face 26 as will hereinafter become apparent.

Washer 28 is urged into its FIG. 1 position by means of a lock nut 46 having internal threads 48 meshed with threads 50 formed on hollow thimble 52. End section 54 of the thimble is externally surfaced at 56 to conform with and tightly engage conical face 58 of flange 12. An O-ring seal 60 may be provided between faces 56 and 58 if desired.

Nut 46 defines an end face 62 in which are formed a series of pockets 64 (FIGS. 12 and 13) having the same configuration as the pockets shown in FIG. 11. Pockets 64 are so directed as to have their locking faces 66 registering with locking faces 36 of arms 32 after nut 46 has been threaded onto thimble 52.

While nut 46 is being threaded onto thimble 52 the nut face 62 cams along faces 34 of washer arms 32 so as to force said arms into void spaces 70 (FIG. 3). During the time periods when arms 32 register with pockets 64 they will of course snap into the recesses; however the arms will thereafter automatically cam upwardly onto face 62 so as not to interfere with threading of nut 46 onto the thimble. While nut 46 is being threaded onto thimble 52 arms 30 will be slidably engaged with end face 26 of collar 20 so as to be forced into void spaces 72 in washer 28. Periodically the arms 30 will snap into pockets 38 but will be thereafter automatically cammed out of said pockets so as not to interfere with threading of nut 46.

During the threading of nut 46 onto thimble 52 conical wall flange 12 will be tightly squeezed between collar surfaces 22 and 56 so as to form a fluid-tight connection. After nut 46 is turned to the approximate desired distance onto thimble 52 it is turned a slight additional distance until the resilient arms 30 and 32 are allowed to snap into their respective pockets 38 and 64. In such "snapped" positions of the rams locking faces 36 are located in registry with locking faces 40 and 66 so as to permanently prevent unthreading of nut 46 from the thimble. Slight reverse movement of the nut causes locking faces 36 (FIG. 5) to abut against faces 40 (FIG. 11) and 66 (FIG. 12) so as to underlie lips 42 (FIG. 11)

and 74 (FIG. 12). The resilient character of arms 30 and 32 (FIGS. 2 and 3) will normally prevent said arms from working out of the pockets, but the provision of lips 42 (FIG. 11) and 74 (FIG. 12) acts as double insurance that the arms will not cam out of the pockets.

In some instances washer 28 (FIGS. 1 and 2) and nut 46 (FIG. 13) may be replaced by the lock nut shown in FIGS. 4 and 5. The FIG. 4 nut includes an annular nut body 76 internally threaded at 78 for reception on thimble threads 50. End face 82 of nut body 76 is cut away and deformed to provide arms 30' (FIG. 5) which are equipped with cam faces 34' and locking faces 36'. Void spaces 72' allow arms 30' to be deflected below the plane of face 82 while the nut is being threaded onto the thimble. It will be undderstood that arms 30' cooperate with pocket faces 42 on collar 20 (FIG. 9) in the same manner as arms 30, the arrangement being such that nut 76 is permanently prevented from being unthreaded off of the thimble.

I claim:

1. In a fluid tank having a wall thereof provided with an ingress-egress opening circumscribed by an out-turned conical flange interposed snugly between complementary conical surfaces formed exteriorly of a thimble projecting axially through the flange and formed interiorly of a collar element surrounding the exterior of the flange, respectively, the thimble being threaded at that portion projecting axially beyond the flange to receive thereon a nut element for retaining the thimble and the collar element in assembly on the flange, the combination therewith of a vibration resistant interlocking of the flange, collar element and nut element comprising complementary lug and recess means on the flange exterior and the interior conical surface of the collar to prevent relative rotation therebetween, locking means interposed between the nut element and the collar element accommodating rotation of the nut element to thread the nut onto the thimble into jammed contact with the collar element but preventing reverse relative rotation therebetween, said nut acting to force said lug into intimate engagement with said recess means, said locking means including deflectible arms co-rotatable with one of the elements and recesses in the other of the elements for receiving the arms, and an annular seal ring carried by the thimble conical surface and contacting the interior conical periphery of the flange to prevent leakage from the tank intermediate the thimble and the flange.

2. In a fluid tank having a wall thereof provided with an ingress-egress opening circumscribed by an out-turned conical flange interposed snugly between complementary conical surfaces formed exteriorly of a thimble projecting axially through the flange and formed interiorly of a collar element surrounding the exterior of the flange, respectively, the thimble being threaded at that portion projecting axially beyond the flange to receive thereon a nut element for retaining the thimble and the collar element in assembly on the flange, the combination therewith of a vibration resistant interlocking of the flange, collar element and nut element comprising complementary lug and recess means on the flange exterior and the interior conical surface of the collar to prevent relative rotation therebetween, locking means interposed between the nut element and the collar element accommodating rotation of the nut element to thread the nut onto the thimble into jammed contact with the collar element but preventing reverse relative rotation therebetween, said nut acting to force said lug into intimate engagement with said recess means, said locking means including deflectible arms co-rotatable with one of the elements and recesses in the other of the elements for receiving the arms.

References Cited in the file of this patent

UNITED STATES PATENTS

| | | |
|---|---|---|
| 174,175 | Adgate | Feb. 29, 1876 |
| 305,004 | Husted | Sept. 9, 1884 |
| 529,633 | Stevens | Nov. 20, 1894 |
| 695,489 | Pruden | Mar. 18, 1902 |
| 782,266 | Poince | Feb. 14, 1905 |
| 1,198,884 | Bennett | Sept. 19, 1916 |
| 1,513,516 | McCabe | Oct. 28, 1924 |
| 1,887,423 | Parker | Nov. 8, 1932 |
| 1,996,751 | Dillhoefer | Apr. 9, 1935 |
| 2,164,109 | Guiducci | June 27, 1939 |

FOREIGN PATENTS

| | | |
|---|---|---|
| 3,993 | Great Britain | Feb. 18, 1907 |
| 347,703 | Great Britain | Apr. 28, 1931 |